United States Patent Office 3,276,863
Patented Oct. 4, 1966

3,276,863
SEPARATION OF NICKEL AND COBALT VALUES
USING α-HYDROXY OXIMES
James L. Drobnick, Lakewood, and Wayne A. Millsap, Arvada, Colo., assignors to General Mills, Inc., a corporation of Delaware
No Drawing. Filed Jan. 21, 1964, Ser. No. 339,090
19 Claims. (Cl. 75—108)

The present invention relates to a process for the separation of nickel values from aqueous solutions containing both nickel and cobalt values. A preferred embodiment of the invention relates to the separation and recovery of nickel values from ammoniacal solutions which also contain cobalt values.

Nickel and cobalt are valuable metals and thus the recovery thereof from ores containing the same is of considerable importance. One of the methods used to recover nickel and cobalt from ores involves the use of acid leach systems. After the leaching step, the acid liquor or feed solution is treated with hydrogen sulfide and filtered. The hydrogen sulfide serves the dual purpose of precipitating copper sulfide and reducing ferric iron to the nonextractable ferrous state. In the next step, cobalt and nickel are extracted as cations from the feed solution with a suitable cation exchange system such as with a substituted aromatic sulfonic acid (dinonylnaphthalene sulfonic acid) in a solvent (kerosene). The cobalt and nickel values are then stripped from the cation exchange system with a strong (6 M) hydrochloric acid solution and the dinonylnaphthalene sulfonic acid is simultaneously regenerated for recycle. The cobalt and nickel concentrations in the strip are about 5 g./l. of each or about twice the concentration in the solvent.

The cobalt is then extracted from the hydrochloric acid stripping medium by an anion exchange system comprising an alkylamine, preferably a tertiary amine, and a suitable solvent such as toluene or kerosene modified with tributyl phosphate. Without the latter modifier, kerosene gives a three-phase system due to the insolubility of the amine hydrochloride. This separation depends on the ability of cobalt (II) to complex with chloride ions to form the complex tetrachlorocobaltate (II) anion. In aqueous solution nickel (II) will not form the analogous tetrachloronickelate (II) anion. The cobalt (II) cations are thus extracted according to the following equation:

$$2R_3N_{org.} + 2H^+{}_{aq.} + Co^{++}{}_{aq.} + 4Cl^-{}_{aq.} \rightleftharpoons (R_3NH)_2CoCl_{4\,org.+aq.}$$

The nickel (II) cations are accordingly left behind in the original aqueous solution. The cobalt is stripped from the organic phase by contacting it with water which, since the chloride concentration is low, causes hydrolysis of the anion into cationic cobalt and chloride ions. The cobalt and nickel values can then be recovered from the respective solutions by known techniques—i.e., electrolysis, precipitation by base and the like.

The above-described step of separating the cobalt values from the nickel values is also employed in the process disclosed in U.S. Patent 3,085,054. Such separation depends on aqueous acidic systems containing substantial quantities of chloride ions. Such acidic chloride solutions are highly corrosive and thus require special corrosion resistant equipment for handling. It would be highly desirable to eliminate the need for these highly acidic chloride solutions in separating nickel and cobalt values from aqueous solutions thereof. The need for special corrosion resistant equipment would accordingly be substantially reduced or eliminated.

It is, therefore, an object of the present invention to provide an improved process for the separation of nickel values from aqueous solutions containing both nickel and cobalt values. Another object of the invention is to provide a method for the separation and recovery of nickel values from ammoniacal solutions which also contain cobalt values. These and other objects will become apparent from the following detailed description.

We have now discovered that nickel values can be separated from aqueous solutions containing both nickel and cobalt values by first oxidizing the cobalt values to the trivalent state and then contacting the aqueous solutions with a water immiscible organic phase containing certain α-hydroxy oximes. The nickel values are extracted into the organic phase while the cobalt values remain in the aqueous phase. The loaded organic phase is separated from the aqueous phase by virtue of the immiscibility of the said phases. Our process is particularly suitable for the separation and recovery of nickel and cobalt values from ammoniacal leach liquors.

The α-hydroxy oxime extractants used in the process of the present invention have the following general formula:

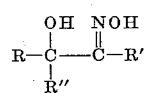

where R, R' and R" may be any of a variety of organic hydrocarbon radicals such as aliphatic and alkyaryl radicals. R" may also be hydrogen. Preferably, R and R' are unsaturated hydrocarbon or branched chain alkyl groups containing from about 6 to 20 carbon atoms. R and R' are also preferably the same and when alkyl are preferably attached to the carbons substituted with the —OH and =NOH groups through a secondary carbon atom. It is also preferred that R" is hydrogen or an unsaturated or branched chain alkyl group containing from about 6 to 20 carbon atoms. The α-hydroxy oximes also preferably contain a total of about 14 to 40 carbon atoms. Representative compounds are 19-hydroxyhexatriaconta-9,27-dien-18-oxime, 5,10-diethyl-8-hydroxytetradecan - 7-oxime, and 5,8-diethyl-7-hydroxydodecane-6-oxime. The latter compound has the following structural formula:

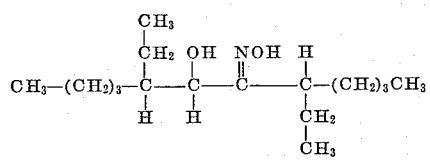

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime extractants are also characterized as having a solubility of at least 2% by weight in the water immiscible solvent used to make up the organic phase and substantially complete insolubility in water.

The α-hydroxy oximes are prepared by reacting an acyloin with a hydroxylamine salt under reflux conditions.

Such reaction can be carried out by refluxing the reactants in an alcohol such as ethanol and adding pyridine to combine with the acid associated with the hydroxylamine. This preparation procedure is illustrated by the following examples.

EXAMPLE A

Into a 1 liter flask equipped with a reflux condenser were charged 106.6 g. (0.4 mole) 5,8-diethyl-7-hydroxydodecan-6-one, 55.6 g. (0.8 mole) hydroxylamine hydrochloride, 250 ml. pyridine and 250 ml. absolute ethanol. The reaction mixture was heated to reflux and held under reflux conditions for 3 hours. The crude mixture, after cooling overnight, was added to 1 liter of water along with 500 ml. ether. The aqueous layer was discarded and the ether layer washed 4 times with water, 2 times with a 3% HCl solution and 4 more times with water. The ether layer was dried and then stripped of ether under vacuum to leave a quantitative yield of a water white product which was 5,8-diethyl-7-hydroxydodecan-6-oxime.

EXAMPLE B

Example A was repeated using 49.3 g. (0.0925 mole) 19-hydroxyhexatriaconta-9,27-dien-18-one (i.e., the acyloin derived from oleic acid), 25.0 g. (0.36 mole) hydroxylamine hydrochloride, 125 ml. pyridine and 125 ml. absolute ethanol. The reaction mixture was refluxed for 1¾ hours and then treated as in Example A. There was obtained 42.0 g. 19-hydroxyhexatriaconta-9,27-dien-18-oxime.

EXAMPLE C

Example A was repeated using 124.6 g. (0.4 mole) isodecanoin (i.e., the acyloin derived from the branched chain decanoic acids obtained in the oxo process), 54.8 g. (0.8 mole) hydroxylamine hydrochloride, 300 ml. pyridine and 300 ml. absolute ethanol. The reaction mixture was refluxed for 2 hours and then treated as in Example A. There was obtained 109.6 g. of a dark yellow liquid which consisted of 97% by weight of a mixture of α-hydroxy oximes having the formula:

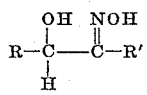

where R and R' are mixed branched chain alkyl groups containing 9 carbon atoms.

Other suitable α-hydroxy oxime extractants can be prepared by reacting the appropriate acyloin compound with the hydroxylamine salt. It is also preferred to use an excess of the salt which may be the hydrochloride or other salts such as acid sulfate and the like.

In addition to the above-described α-hydroxy oxime compounds, the organic phase comprises a water immiscible solvent. Preferred solvents include aliphatic and aromatic hydrocarbons such as benzene, toluene, xylene, Skellysolve B, fuel oil and kerosene. Generally, the α-hydroxy oxime extractant will be present in the organic phase in an amount sufficient to extract at least a portion of the nickel values from the aqueous solutions. Preferably, the oxime will be present in an amount of from about 2 to about 50% by weight based on the total organic phase with an amount of from 2 to 15% by weight being particularly preferred.

The organic phase may also contain other materials such as a conditioner which typically is a long chain aliphatic alcohol such as capryl alcohol, isodecanol, tridecyl alcohol or 2-ethyl hexanol. If the conditioner is present in the organic phase, it will be used preferably in amounts of from about 0.5 to 10 weight percent.

As indicated above, the first step in our process is the oxidation of the cobalt values to the trivalent state in the aqueous solutions containing both nickel and cobalt values.

Any oxidizing agent capable of oxidizing cobalt values from the divalent to trivalent state may be employed. Representative thereof are oxygen, air, hydrogen peroxide, ammonium persulfate and the like. For reasons of economy and availability, it is preferred to employ air as the oxidizing agent.

The aqueous solution containing the nickel values and the trivalent cobalt values is then contacted with the water-immiscible organic phase containing the α-hydroxy oxime. The two phases are preferably agitated during the contacting period. The nickel values are extracted into the organic phase while the cobalt values remain in the aqueous phase. The immiscible phases are then separated by conventional means.

The nickel values can be stripped from the loaded organic phase by employing an aqueous solution of a strong acid or ammonia. Suitable acids include mineral acids such as sulfuric acid, nitric acid and the like. The nickel values can then be recovered from the aqueous stripping solution by conventional electrolysis or crystallization techniques. In the case of the sulfuric acid stripping system, the nickel sulfate solution can be subjected to electrolysis which also simultaneously regenerates sulfuric acid to be recycled to the stripping system. Additionally, the nickel sulfate solution can be subjected to crystallization for nickel sulfate recovery. In the case of the ammonia stripping system, the excess ammonia can be removed by heating the nickel-pregnant stripping solution. The nickel values are thus precipitated, probably as the hydroxide. Also, hydrogen reduction can be used to obtain nickel powder.

Since the nickel to cobalt ratio of most ore bodies is quite high, the nickel-barren aqueous leaching solution can be recycled many times before the cobalt concentration in solution is of sufficient magnitude (i.e. about 15–20 g./l. Co) to process for cobalt recovery. A small bleed stream can be taken from such nickel-barren raffinate for cobalt recovery. Cobalt values can then be recovered by various means such as crystallization after removal of ammonia by heating the aqueous solution, acidification of the bleed stream followed by subsequent electrolysis, and hydrogen reduction to form cobalt metal powder.

The process of the present invention can be carried out continuously. Thus a feed solution containing the nickel and cobalt values can be oxidized and then advanced at a predetermined rate to a continuous countercurrent mixer-settler unit. The number of stages can be varied as desired, depending on the efficiency of extraction and stripping.

The invention is further described by the following examples. The examples are illustrative only and do not constitute limitations on the invention.

*Example I*

An aqueous feed solution was prepared containing 2.0 g./l. Ni (added as NiSO$_4$), 2.0 g./l. Co (added as CoSO$_4$), 10.0 g./l. NH$_3$ (added as NH$_4$OH) and 30.0 g./l. (NH$_4$)$_2$CO$_3$. Air was introduced into the cobalt-nickel pregnant aqueous solution through a small gas dispersion tube. Samples of the aqueous solution were withdrawn at 30 minute intervals and contacted with equal volumes of an organic phase consisting of 95 volume percent kerosene and 5 volume percent of the α-hydroxy oxime of Example A. The extractions were performed on a single stage batch basis at ambient room temperature. The organic solvent was first added to a separatory funnel followed by addition of the aqueous phase. The funnels were shaken to equilibrate the mixtures and then the phases were allowed to separate. Total contact time was about 90 seconds. The loaded organic phase was analyzed for cobalt and nickel content and the percent extraction of each of the metals was calculated. The results are set forth in the following Table I.

TABLE I

| Aeration Period (minutes) | Loaded Organic | | Percent Extraction | |
|---|---|---|---|---|
| | g./l. Co | g./l. Ni | Co | Ni |
| 0 | 1.35 | 0.24 | 67.5 | 12.0 |
| 30 | 0.84 | 1.36 | 32.0 | 68.0 |
| 60 | 0.40 | 1.59 | 20.0 | 79.5 |
| 90 | 0.23 | 1.61 | 11.6 | 80.5 |
| 120 | 0.03 | 1.61 | 1.5 | 82.0 |

This example shows that as the aeration or oxidation period is increased (cobalt oxidized to trivalent state), the percent extraction of nickel increases greatly and the percent cobalt extraction is reduced to substantially negligible amounts. Continuation of the aeration period reduces the cobalt extraction to zero and further increases the nickel extraction.

The extracted nickel can be stripped from the loaded organic phase by contacting the same with a stripping medium such as aqueous ammonia or an aqueous solution of a strong acid. This is shown by the following examples.

*Examples II–VIII*

An organic phase as used in Example I was loaded with 2.84 g./l. Ni (from $NiSO_4$) by contacting said solvent with an ammoniacal aqueous solution to which $NiSO_4$ had been added. Portions of this loaded organic solvent were contacted with various stripping mediums at an organic:aqueous phase ratio of 2.5:1. The contacting was carried out in separatory funnels or beakers at ambient room temperature. Magnetic mixers were used to agitate the mixtures in the beakers with the latter being used in those examples involving more than three minute mixing periods. The organic phase was analyzed for nickel content and the percent stripping of nickel was calculated. The results are set forth in the following Table II.

TABLE II

| Example | Aqueous Stripping Medium | Stripping Time (minutes) | Organic Phase, g./l. Ni | | Ni Stripped |
|---|---|---|---|---|---|
| | | | Loaded | Stripped | |
| II | 200 g./l. $H_2SO_4$ | 45 | 2.84 | 1.69 | 40.6 |
| III | 200 g./l. $H_2SO_4$ | 25 | 2.84 | 1.76 | 38.1 |
| IV | 200 g./l. $H_2SO_4$ | 3 | 2.84 | 2.30 | 19.1 |
| V | 261 g./l. $NH_3$ | 3 | ¹ 2.30 | 0.16 | 93.1 |
| VI | 261 g./l. $NH_3$ | 3 | 2.84 | 1.42 | 50.0 |
| VII | 300 g./l. $HNO_3$ | 3 | 2.84 | 0.10 | 96.5 |
| VIII | 200 g./l. $H_2SO_4$ | 45 | ² 2.84 | 0.25 | 91.2 |

¹ The stripped organic phase of Example IV was stripped with aqueous ammonia in this example.
² Five percent by weight isodecanol added to the organic phase prior to the stripping operation.

The above examples demonstrate that the Ni values can be effectively stripped from the loaded organic phase. Aqueous nitric acid and ammonia give particularly good results. Stripping efficiency with sulfuric acid increases with increasing contact time and the addition of a conditioner, such as isodecanol, to the organic phase also increases the stripping efficiency of aqueous sulfuric acid.

As indicated above, the present invention provides an effective method for the separation and recovery of nickel and cobalt values from aqueous solutions without employing highly corrosive acidic chloride solutions. The process is particularly valuable for the separation and recovery of cobalt and nickel values from ammoniacal leach liquors. Thus cobalt and nickel containing ores may be pressure leached with ammonia. Leaching conditions vary widely depending, for example, on the different ore bodies. Representative conditions for leaching are 175–195° F. at 100–125 p.s.i.g. The resulting nickel and cobalt containing ammoniacal solutions can then be treated according to our process to separate and recover the nickel values and also the cobalt values where desired. In this respect, the oxidation of the cobalt values can take place during the leaching or be performed at any time prior to the contacting of the solution with the organic phase. Ammoniacal solutions containing the said metal values and various ammonium compounds such as ammonium carbonate, ammonium bicarbonate, ammonium sulfate, ammonium chloride, ammonium nitrate, ammonium hydroxide and the like can be effectively processed according to the present invention.

It is to be understood that the invention is not to be limited to the exact details of operation or the exact processes shown or described, as obvious modifications and equivalents will be apparent to those skilled in the art and the invention is to be limited only by the scope of the appended claims.

The embodiments of the invention in which an exclusive property or privilege is claimed are defined as follows:

1. A process for the separation of nickel values from aqueous solutions which contain both nickel and cobalt values which comprises: (1) oxidizing the cobalt values in the aqueous solution to the trivalent state; (2) contacting the resulting solution with a liquid organic phase comprising a water-immiscible organic solvent and an α-hydroxy oxime to extract at least a portion of the nickel values into the organic phase, said oxime being characterized as having a solubility of at least 2% in the organic solvent and having the formula:

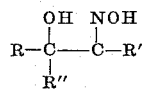

where R and R' are organic hydrocarbon radicals and R" is selected from the group consisting of hydrogen and organic hydrocarbon radicals; and (3) separating the resultant nickel-pregnant organic phase from the aqueous phase.

2. A process as defined in claim 1 wherein the aqueous solution is derived from the ammonia leaching of cobalt and nickel containing ores.

3. A process as defined in claim 1 wherein the oxidizing (1) is accomplished using air as the oxidizing agent.

4. A process as defined in claim 1 wherein R and R' are selected from the group consisting of unsaturated hydrocarbon and branched chain alkyl groups containing from about 6 to 20 carbon atoms.

5. A process as defined in claim 4 wherein R and R' are alkyl groups attached to the carbons substituted with the —OH and =NOH groups through a secondary carbon atom.

6. A process as defined in claim 4 wherein R" is hydrogen.

7. A process as defined in claim 4 wherein R" is selected from the group consisting of unsaturated hydrocarbon and branched chain alkyl groups containing from about 6 to 20 carbon atoms.

8. A process as defined in claim 1 wherein the α-hydroxy oxime contains a total of from about 14 to 40 carbon atoms.

9. A process as defined in claim 1 wherein the α-hydroxy oxime is 5,8-diethyl-7-hydroxydodecan-6-oxime.

10. A process as defined in claim 1 wherein the organic phase contains from about 2 to about 50% by weight of the α-hydroxy oxime.

11. A process as defined in claim 1 wherein the organic solvent is a hydrocarbon solvent.

12. A process as defined in claim 11 wherein the hydrocarbon solvent is kerosene.

13. A process as defined in claim 1 wherein the organic phase also contains from about 0.5 to 10% by weight of a conditioner.

14. A process as defined in claim 1 wherein the nickel-pregnant organic phase is (4) stripped with an aqueous stripping medium.

15. A process as defined in claim 14 wherein the aqueous stripping medium is selected from the group consisting of aqueous ammonia and aqueous solutions of strong acids.

16. A process as defined in claim 15 wherein the strong acids are mineral acids.

17. A process as defined in claim 14 wherein the nickel-pregnant aqueous stripping medium is (5) separated from the nickel-barren organic phase.

18. A process as defined in claim 17 wherein the nickel values are (6) recovered from the nickel-pregnant aqueous stripping medium.

19. A process as defined in claim 1 wherein the cobalt values are (7) recovered from the extracted and separated aqueous phase.

References Cited by the Examiner
UNITED STATES PATENTS

| | | | |
|---|---|---|---|
| 2,993,782 | 7/1961 | Hampton et al. | 75—117 |
| 3,104,971 | 9/1963 | Olson et al. | 75—117 |
| 3,215,524 | 11/1965 | Fetscher et al. | 75—117 |
| 3,224,873 | 12/1965 | Swanson | 75—117 |

DAVID L. RECK, *Primary Examiner.*

N. F. MARKVA, *Assistant Examiner.*